United States Patent
Zaretsky et al.

(10) Patent No.: US 11,429,301 B2
(45) Date of Patent: Aug. 30, 2022

(54) DATA CONTEXTUAL MIGRATION IN AN INFORMATION HANDLING SYSTEM

(71) Applicant: Dell Products L.P., Round Rock, TX (US)

(72) Inventors: Lee B. Zaretsky, Pflugerville, TX (US); Michael S. Gatson, Austin, TX (US)

(73) Assignee: Dell Products L.P., Round Rock, TX (US)

(*) Notice: Subject to any disclaimer, the term of this patent is extended or adjusted under 35 U.S.C. 154(b) by 247 days.

(21) Appl. No.: 16/855,632

(22) Filed: Apr. 22, 2020

(65) Prior Publication Data
US 2021/0334027 A1  Oct. 28, 2021

(51) Int. Cl.
*G06F 3/06* (2006.01)
*G06F 11/30* (2006.01)
(Continued)

(52) U.S. Cl.
CPC .......... *G06F 3/0647* (2013.01); *G06F 3/067* (2013.01); *G06F 3/0611* (2013.01);
(Continued)

(58) Field of Classification Search
CPC ...... G06F 3/0647; G06F 3/0611; G06F 3/067; G06F 11/3006; G06F 11/3495;
(Continued)

(56) References Cited

U.S. PATENT DOCUMENTS

| | | | |
|---|---|---|---|
| 2006/0005074 A1* | 1/2006 | Yanai | G06F 11/2082 714/6.32 |
| 2014/0240360 A1* | 8/2014 | Song | G06T 1/60 345/659 |

(Continued)

FOREIGN PATENT DOCUMENTS

| | | | | |
|---|---|---|---|---|
| CN | 110956275 A | * | 4/2020 | ............. G06N 20/00 |
| CN | 110990859 A | * | 4/2020 | ......... G06F 21/6245 |

(Continued)

OTHER PUBLICATIONS

Ritesh Ranjan, "Calibration in Machine Learning", Sep. 14, 2019, pp. 1-11, https://medium.com/analytics-vidhya/calibration-in-machine-learning-e7972ac93555 (Year: 2019).*

*Primary Examiner* — Christopher D Birkhimer
(74) *Attorney, Agent, or Firm* — Baker Botts, L.L.P.

(57) ABSTRACT

Methods, systems, and computer programs encoded on computer storage medium, performing, at first time, a calibration and configuration of a data contextual migration model, including: identifying contextual data associated with contextual inputs to a IHS, the contextual data including user contextual data, environmental context data, and system telemetry contextual data; training, based on the contextual data, the data contextual migration model, including: tagging, for each data block of a plurality of data blocks, the data block with identifiers indicating a store location of the data block; storing, based on the identifier associated with each data block, the data block at a local data store of the information handling system, at a remote data store of a remote server computing system, or both; generating a configuration policy including configuration rules, the configuration rules for prioritizing pre-loading of a subset of the data blocks to be provided at the information handling system.

20 Claims, 3 Drawing Sheets

(51) Int. Cl.
  *G06F 11/34* (2006.01)
  *G06N 5/04* (2006.01)
  *G06N 20/00* (2019.01)
  *H04L 67/1095* (2022.01)

(52) U.S. Cl.
  CPC ...... *G06F 11/3006* (2013.01); *G06F 11/3495* (2013.01); *G06N 5/04* (2013.01); *G06N 20/00* (2019.01); *H04L 67/1095* (2013.01)

(58) Field of Classification Search
  CPC ....... G06F 3/0604; G06F 3/0649; G06N 5/04; G06N 20/00; H04L 67/1095
  See application file for complete search history.

(56) References Cited

U.S. PATENT DOCUMENTS

| | | | |
|---|---|---|---|
| 2017/0206218 A1* | 7/2017 | Jai | G06F 16/2365 |
| 2017/0208052 A1* | 7/2017 | Jai | G06F 16/183 |
| 2017/0208125 A1* | 7/2017 | Jai | H04L 67/325 |
| 2018/0341592 A1* | 11/2018 | Drerup | G06F 12/0862 |
| 2019/0384525 A1* | 12/2019 | Danilov | G06F 3/0683 |
| 2020/0007620 A1* | 1/2020 | Das | H04L 43/16 |
| 2020/0104754 A1* | 4/2020 | Veshchikov | G06F 16/22 |

FOREIGN PATENT DOCUMENTS

| | | | | |
|---|---|---|---|---|
| CN | 111026970 A | * | 4/2020 | |
| EP | 2196772 B1 | * | 12/2015 | G01C 21/26 |

\* cited by examiner

DATA CONTEXTUAL MIGRATION IN AN INFORMATION HANDLING SYSTEM

BACKGROUND

Field of the Disclosure

The disclosure relates generally to an information handling system, and in particular, data contextual migration in the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

User data stored within a host information handling system has long been a key attribute of system architectures, going back to early mainframe implementations. Even as information handling systems morphed into endpoint "personal" computers, user data continued to be localized within the platform. While it may be convenient for such data to be in near proximity to the user, the ever growing amount of personal and professional data has created challenges for both user and computer designer alike. As the desire increases for mobile platforms to be thin and light and run all day on a single charge of the battery, maintaining locality of growing amounts of data becomes much more difficult to achieve.

SUMMARY

Innovative aspects of the subject matter described in this specification may be embodied in a method including performing, at first time, a calibration and configuration of a data contextual migration model, including: identifying contextual data associated with contextual inputs to an information handling system, the contextual data including user contextual data, environmental context data, and system telemetry contextual data; training, based on the contextual data, the data contextual migration model, including: tagging, for each data block of a plurality of data blocks, the data block with identifiers indicating a store location of the data block; storing, based on the identifier associated with each data block of the data blocks, the data block at a local data store of the information handling system, at a remote data store of a remote server computing system, or both; generating a configuration policy including configuration rules, the configuration rules for prioritizing pre-loading of a subset of the data blocks to be provided at the information handling system; performing, by the data contextual migration computing module at a second time, a steady-state monitoring of the information handling system, including: monitoring the contextual inputs of the information handling system; and in response to monitoring the contextual inputs, i) accessing the data contextual migration model including the configuration policy, ii) identifying one or more of the configuration rules based on the monitored contextual inputs, and iii) applying the one or more configuration rules to perform one or more of the computer-implemented actions to prioritize pre-loading of the subset of data blocks to be provided at the information handling system.

Other embodiments of these aspects include corresponding systems, apparatus, and computer programs, configured to perform the actions of the methods, encoded on computer storage devices.

These and other embodiments may each optionally include one or more of the following features. For instance, prioritizing pre-loading of the subset of data blocks includes obtaining the subset of data blocks from the remote data store of the remote server computing system at the information handling system without user interaction. Identifying the contextual data includes identifying a location of the information handling system when tagging the data block with identifiers, wherein generating the configuration policy including the configuration rules includes generating the configuration policy based on the location of the information handling system. Identifying the configuration rules based on the location of the information handling system at the second time. The identified configuration rules prevents access of the subset of the data blocks at the information handling system at the location of the information handling system at the second time. Identifying the contextual data includes identifying a time of the information handling system when tagging the data block with identifiers, wherein generating the configuration policy including the configuration rules includes generating the configuration policy based on the time of the information handling system. Identify the configuration rules based on the time of the information handling system at the second time. Prioritizing pre-loading of the subset of data blocks to be provided at the information handling system further includes minimizing latency of providing the subset of data blocks at the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
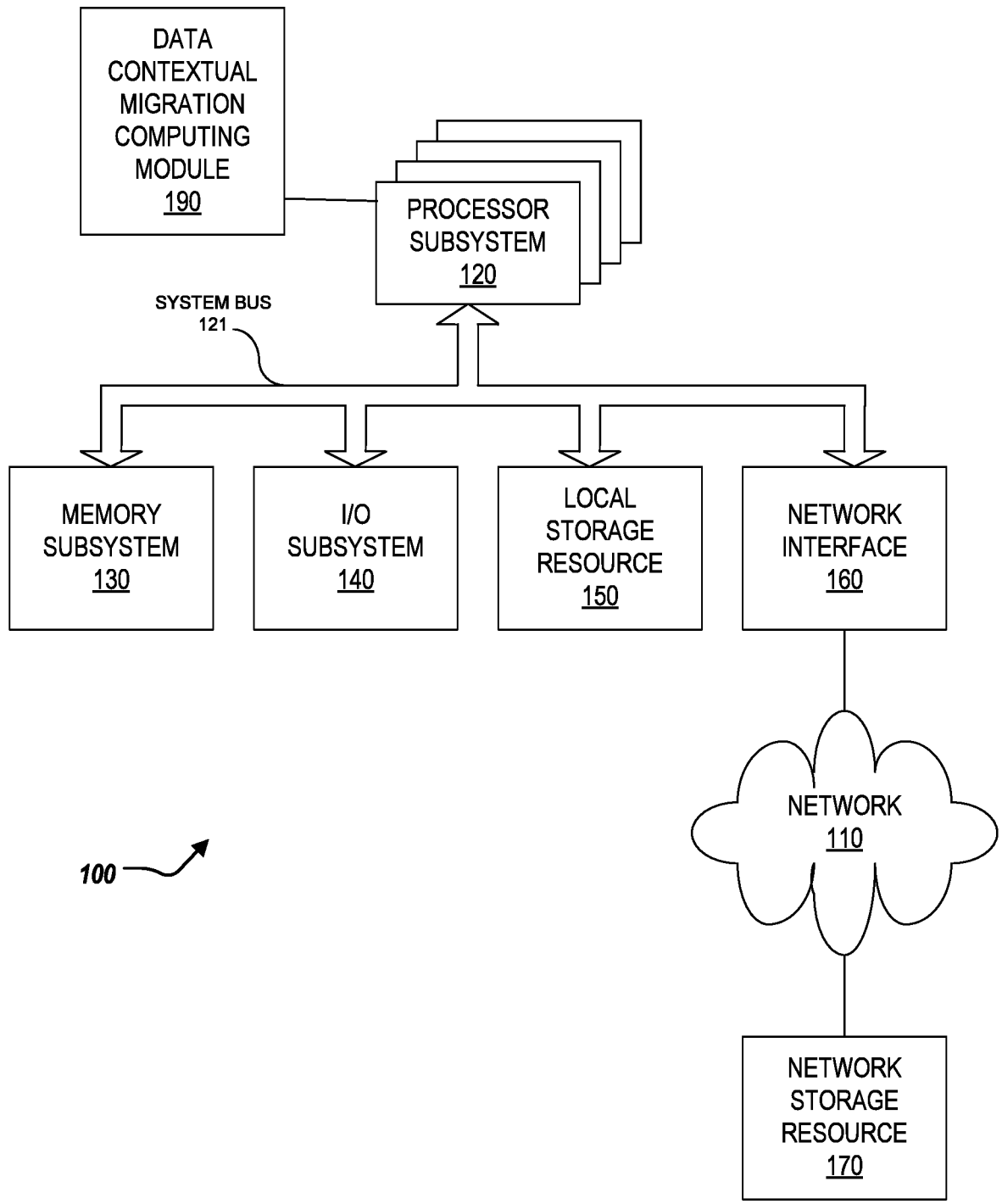
FIG. 1 is a block diagram of selected elements of an embodiment of an information handling system.
Figure 2:
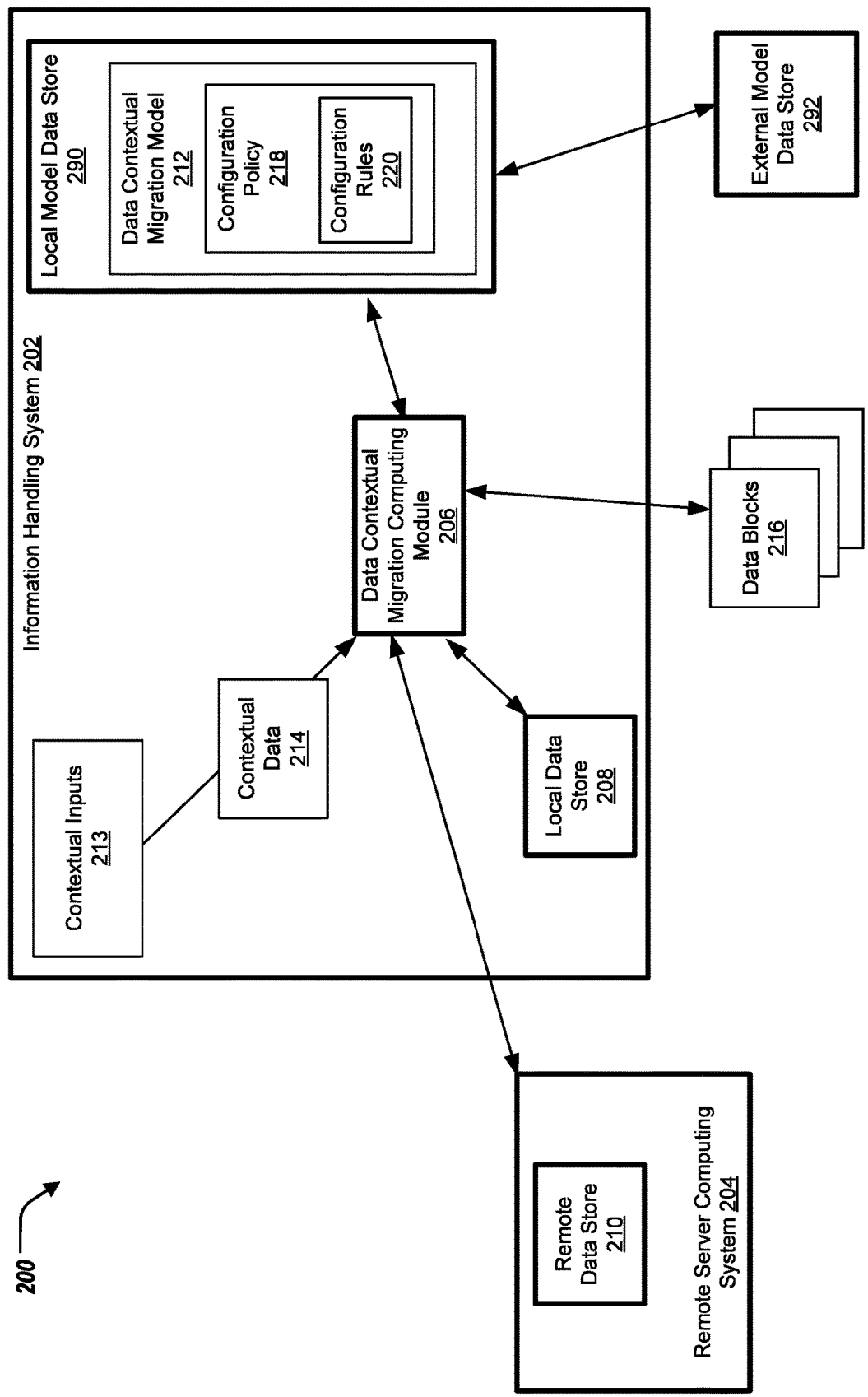
FIG. 2 illustrates a block diagram of the information handling system for data contextual migration.
Figure 3:
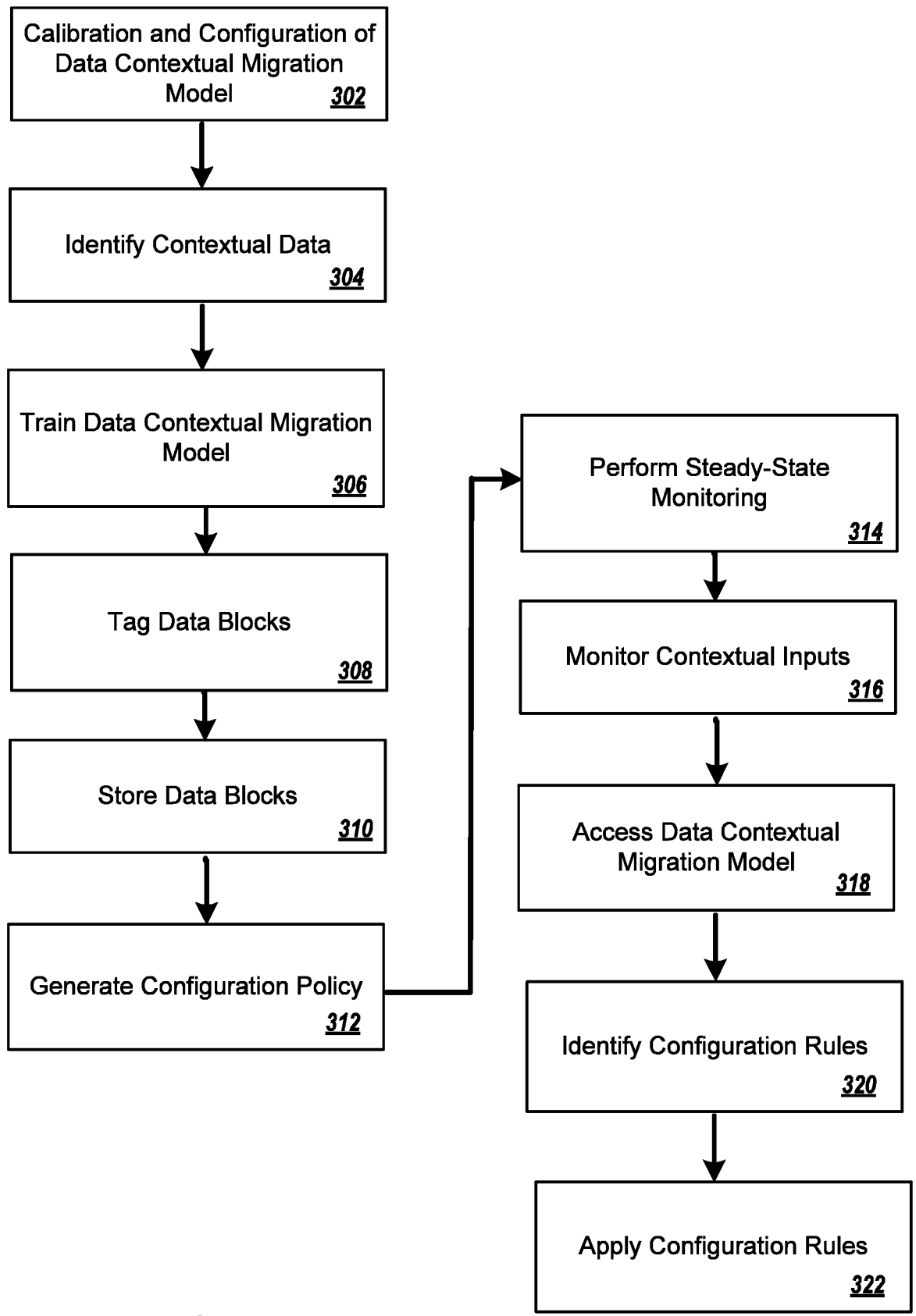
FIG. 3 illustrates a method for data contextual migration in an information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can further include a data contextual migration computing module 190. For example, the data contextual migration computing module 190 can be included by the processor subsystem 120, and/or in communication with the processor subsystem 120. The data contextual migration computing module 190 is described further herein.

Turning to FIG. 2, FIG. 2 illustrates a computing environment 200 including an information handling system 202, a remote server computing system 204, and an external model data store 292. The information handing system 202 can be in communication with the remote server computing system 204. The information handling system 202 can include a data contextual migration computing module 206, a local data store 208, and a local model data store 290. The data contextual migration computing module 206 can be in communication with the local data 208. The local model data store 290 can be in communication with the external model data store 292. The remote server computing system 204 can include a remote data store 210.

In some examples, the information handling system 202 is similar to, or includes, the information handling system 100 of FIG. 1. In some examples, the data contextual migration computing module 206 can be the same, or substantially similar to, the data contextual migration computing module 190 of FIG. 1.

In short, the information handling system 202, and in particular, the data contextual migration computing module 206, can dynamically distribute data blocks 216 across the local data store 208 and the remote data store 210 (given the presences of a pervasive communication connection). The data blocks 216 can be associated with contextual data such as data that is moved between the local data store 208 and the remote data store 210 based on the contextual data (e.g., user data, environmental data, temporal data) utilizing neural networks and/or machine learning to pre-load the data blocks 216 for the information handling system 202. This extends the overall data store for the information handling system 202, while dramatically reducing local store of the data blocks 216. This provide such benefits as reducing a density and a physical footprint of the local storage; significant power demand reduction related to the local storage; application of machine learning techniques and contextual telemetry to pre-load data for reduced latency; and utilization of context to limit access to secure data in non-secure locations (e.g., sensitive work data will not load in a non-work environment).

In some implementations, the data contextual migration computing module 206 can perform, at a first time, a calibration and configuration of a data contextual migration model 212. The data contextual migration module 212 can be stored at the local model data store 290, the external model store 292, or both, as described further herein. Specifically, performing of the calibration and the configuration of the data contextual migration model 212 can include identifying contextual data 214 associated with contextual inputs 213 of the information handling system 202. Specifically, the contextual data 214 can include such contextual data as user contextual data, environmental contextual data, and system telemetry contextual data. For example, user contextual data can include application and process information data (e.g., interaction data by the user with the information handling system 202). The environmental contextual data can include such contextual data as accelerometer, humidity, temperature, and other sensor-based data of the information handling system 202. The system telemetry contextual data can include contextual data as battery status, processor performance, network connectivity, time, and location.

In some implementations, the data contextual migration computing module 206 can train, based on the contextual data 214, the data contextual migration model 212. Specifically, the data contextual migration computing module 206 tags each data block 216 with identifiers indicating a store location of the data block 216. The data contextual migration computing module 206 can store, based on the identifier, the data block 216 at the local data store 208, the remote data store 210, or both. For example, the data contextual migration computing module 206 can tag the data blocks 216 based on locality considerations within a storage protocol, and then routed to the local data store 208 or the remote data store 210. In some examples, the data contextual migration computing module 206 can tag one or more of the data blocks 216 with identifiers indicating that the data blocks 216 are sensitive (e.g., with respect to certain working contexts).

The data contextual migration computing module 206 can generate, based on the contextual data 214 identified at the first time, a configuration policy 218 that includes configuration rules 220. In some examples, the configuration rules 220 are rules for prioritizing pre-loading of a subset of the data blocks 216 to be provided at the information handling system 202. In some examples, the configuration rules 220 are rules for automatically prioritizing pre-loading of a subset of the data blocks 216 to be provided at the information handling system 202 without user interaction.

To that end, the data contextual migration computing module 206 can train the data contextual migration model 212 to establish connections between the contextual data 214 and the configuration rules 220. Specifically, the data contextual migration model 212 can identify one or more configurations rule 216 to be applied based on a connection with one or more of the contextual data 214. In some examples, the data contextual migration computing module 206 can train the data contextual migration model 212 using a machine learning process, and/or a neural network. For example, the data contextual migration computing module 206 can generate the configuration policy 218 including the configuration rules 220 by generating the configuration policy 218 based on the location of the information handling system 202. For example, the data contextual migration computing module 206 can generate the configuration policy 218 including the configuration rules 220 by generating the configuration policy 218 based on the current time of the information handling system 202. In some examples, the configuration rules 220 can include preloading for data blocks 216 from the remote data store 210 to the local data store 208. In some examples, the configuration rules 220 can include preventing access to the data blocks 216 at the information handling system 202. In some examples, the configuration rules 220 can include storing the data blocks 216 at the local data store 208, the remote data store 210, or both. In some examples, the configuration rules 220 can include blocking storing of the data blocks 216 at the local data store 208. In some examples, the configuration rules 220 can include expunging the data blocks 216 from the local data store 208.

For example, the data contextual migration computing module 206 can identify contextual data 214, at the first time(s), that indicates the location of the information handling system 202 is at a home location 2 days per week (location, time); that the information handling system 202 has VPN access with access to secure applications, and an unreliable network connection (network connectivity). The data contextual migration computing module 206 can train the data contextual migration module 212 to generate the configuration policy 218 including generating the configuration rules 220 based on such contextual data. For example, the configuration rules 220 for such contextual data 214 (e.g., a trusted location with secure but unreliable access to the data blocks 216) can be to store the relevant data blocks 216 at the local data store 208, and pre-loading of the subset of data blocks 216 from the local data store 208.

For example, the data contextual migration computing module 206 can identify contextual data 214, at the first time, that indicates the location of the information handling system 202 (e.g., a coffee shop) (location); that the information handling system 202 is utilizing battery power (DC power) (battery status); the processor performance is throttled (processor performance); and the applications running (application data). The data contextual migration computing module 206 can train the data contextual migration module 212 to generate the configuration policy 218 including generating the configuration rules 220 based on such contextual data. For example, the configuration rules 220 for such contextual data 214 (coffee shop location, DC power, throttled processor, and application type) can be to store the relevant data blocks 216 at the location data store 208 to optimize user of network and processor resources.

For example, the data contextual migration computing module 206 can identify contextual data 214, at the first time, that indicates the location of the information handling system 202 is on an airplane (location); that the information handling system 202 has poor a network connection (network connectivity); and limited battery life (battery status). The data contextual migration computing module 206 can train the data contextual migration module 212 to generate the configuration policy 218 including generating the configuration rules 220 based on such contextual data. For example, the configuration rules 220 for such contextual data 214 (airplane location, poor network connectivity, low battery status) can be to pre-load the relevant data blocks 216 from the remote data store 210.

In some implementations, the data contextual migration computing module 206 can perform, at a second time after the first time, a steady-state monitoring of the information handling system 202. In other words, the data contextual migration computing module 206 can monitor the information handling system 202, and in particular, the contextual inputs 213, for computer-related events that could trigger activation of the configuration rules 220 by the data contextual migration computing module 206. In short, the data contextual migration computing module 206 can move data blocks 216 to and from the local data store 208 of the information handling system 202 to meet the needs of the user of the information handling system 202 (e.g., without user interaction). The data contextual migration computing module 206 can move the data blocks 216 as appropriate using a neural network and/or machine learning.

Specifically, the data contextual migration computing module 206 can monitor the contextual inputs 213 of the information handling system 202. In some examples, the data contextual migration computing module 206 can monitor the contextual data 214 such as user contextual data, environmental contextual data, and system telemetry contextual data. For example, the data contextual migration computing module 206 can monitor the location of the information handling system 202; a current time associated with the information handling system 202; a battery status of the information handling system 202; a network connectivity of the information handling system 202; a processor performance of the information handling system 202; environmental status (humidity, temperature) of the information handling system 202; an acceleration of the information handling system 202; and a current application executing at the information handling system 202.

In some implementations, the data contextual migration computing module 206 can, in response to monitoring the contextual inputs 213, access the data contextual migration model 212 including the configuration policy 218. The data contextual migration computing module 206 can further identify one or more of the configuration rules 220 based on the monitored contextual inputs 213. Furthermore, the data contextual migration computing module 206 can apply the configuration rules 206 to the information handling system 202. In other words, the data contextual migration computing module 206 can apply appropriate configuration rules 220 based on the monitored contextual inputs 213 as provided by the data contextual migration model 212.

In some examples, the local model data store 290 can be synchronized with the external model data store 292. Specifically, the data contextual migration model 212 can be synchronized across the local model data store 290 and the external model data store 292. In some examples, the data contextual migration model 212 can be stored simultaneously at both the local model data store 290 and the external model data store 292. In some examples, the synchronization between the local model data store 290 and the external model data store 292 can be performed automatically—for example, in response to an update to the data contextual migration model 212, or time-based.

In some examples, the data contextual migration computing module 206 can apply the configuration rules 220 to automatically perform one or more computer-implemented actions for pre-loading of the subset of data blocks 216 to be provided at the information handling system 202. For example, the data contextual migration computing module 206 can apply configuration rules 220 to obtain the subset of the data blocks 216 from the remote data store 210 at the information handling system 202 without user interaction. The data contextual migration computing module 206 can apply configuration rules 220 to automatically perform one or more computer-implemented actions for pre-loading of the subset of data blocks 216 to be provided at the information handling system 202 to minimize latency of providing the subset of the data blocks 216 at the information handling system 202.

In some examples, the data contextual migration computing module 206 identifies the configuration rules 220 based on the location of the information handling system 202, and applies such configuration rules 220 to the data blocks 216. In some examples, the configuration rules 220 that are based on the location of the information handling system 202 can prevent access of the subset of the data blocks 216 at the information handling system 202 when the information handling system 202 is at the location at the second time.

In some examples, the data contextual migration computing module 206 identifies the configuration rules 220 based on the time of the information handling system 202, and applies such configuration rules 220 to the data blocks 216. In some examples, the configuration rules 220 that are based on the time of the information handling system 202 can prevent access of the subset of the data blocks 216 at the information handling system 202 when the information handling system 202 at the second time.

For example, the data contextual migration computing module 206 can monitor the contextual inputs 213 and determine that the contextual data 214 indicates that the information handling system 202 is at a home location with an unreliable network connection. In response, the data contextual migration computing module 206 can access the data contextual migration model 212, identify the configuration rules 220 that are applicable to determining that the information handling system 202 is at the home location with an unreliable network connection, and apply such configuration rules 220. For example, the data contextual migration computing module 206 can apply the configuration rules 220 such as pre-loading of the subset of data blocks 216 to reduce latency.

For example, the data contextual migration computing module 206 can monitor the contextual inputs 213 and determine that the contextual data 214 indicates that the information handling system 202 is at the coffee shop, utilizing DC power, and the processor is throttled. In response, the data contextual migration computing module 206 can access the data contextual migration model 212, identify the configuration rules 220 that are applicable to determining that the information handling system 202 is at the coffee shop, utilizing DC power, and the processor is throttled, and apply such configuration rules 220. For example, the data contextual migration computing module 206 can apply the configuration rules 220 such as preloading of the subset of data blocks 216 at the local data store to reduce latency.

For example, the data contextual migration computing module 206 can monitor the contextual inputs 213 and determine that the contextual data 214 indicates that the information handling system 202 is at the on an airplane, poor network connection, and limited battery life. In response, the data contextual migration computing module 206 can access the data contextual migration model 212, identify the configuration rules 220 that are applicable to determining that the information handling system 202 is on an airplane, poor network connection, and limited battery life, and apply such configuration rules 220. For example, the data contextual migration computing module 206 can apply the configuration rules 220 such as pre-loading of the subset of data blocks 216 at the local data store to reduce latency.

FIG. 3 illustrates a flowchart depicting selected elements of an embodiment of a method 300 for data contextual migration in an information handling system. The method 300 may be performed by the information handling system 100, the computing environment 200, the information handling system 202 and/or the data contextual migration computing module 206, and with reference to FIGS. 1-2. It is noted that certain operations described in method 300 may be optional or may be rearranged in different embodiments.

The data contextual migration computing module 206 can perform, at a first time, a calibration and configuration of the data contextual migration model 212 (302). The data contextual migration computing module 206 can identify contextual data 214 associated with the contextual inputs 213 of the information handling system 202 (304). In some examples, the contextual data 214 can include such contextual data as user contextual data, environmental contextual data, and system telemetry contextual data. The data contextual migration computing module 206 can train, based on the contextual data 214, the data contextual migration model 212 (306). The data contextual migration computing module 206 can tag each data block 216 with identifiers indicating a store location of the data block 216 (308). The data contextual migration computing module 206 can store, based on the identifier, the data block 216 at the local data store 208, the remote data store 210, or both (310). The data contextual migration computing module 206 can generate, based on the contextual data 214 identified at the first time, a configuration policy 218 that includes configuration rules 220 (312). In some examples, the configuration rules 220 are rules for prioritizing pre-loading of a subset of the data blocks 216 to be provided at the information handling system 202.

The data contextual migration computing module 206 can perform, at a second time after the first time, a steady-state monitoring of the information handling system 202 (314). The data contextual migration computing module 206 can monitor the contextual inputs 213 of the information handling system 202 (316). The data contextual migration computing module 206 can, in response to monitoring the contextual inputs 213, access the data contextual migration model 212 including the configuration policy 218 (318). The data contextual migration computing module 206 can further identify one or more of the configuration rules 220 based on the monitored contextual inputs 213 (320). The data contextual migration computing module 206 can apply the configuration rules 206 to the information handling system 202 (322). In some examples, the data contextual migration computing module 206 can apply configuration rules 220 to perform one or more of the computer-implemented actions to prioritize pre-loading of the subset of data blocks 216 to be provided at the information handling system 202.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
performing, at first time, a calibration and configuration of a data contextual migration model, including:
identifying contextual data associated with contextual inputs to an information handling system, the contextual data including user contextual data, environmental context data, and system telemetry contextual data;
training, based on the contextual data, the data contextual migration model, including:
tagging, for each data block of a plurality of data blocks, the data block with identifiers indicating a store location of the data block;
storing, based on the identifier associated with each data block of the data blocks, the data block at a local data store of the information handling system, at a remote data store of a remote server computing system, or both;
generating a configuration policy including configuration rules, the configuration rules for prioritizing pre-loading of a subset of the data blocks to be provided at the information handling system;

performing, by the data contextual migration computing module at a second time, a steady-state monitoring of the information handling system, including:
monitoring the contextual inputs of the information handling system; and
in response to monitoring the contextual inputs, i) accessing the data contextual migration model including the configuration policy, ii) identifying one or more of the configuration rules based on the monitored contextual inputs, and iii) applying the one or more configuration rules to prioritize pre-loading of the subset of data blocks to be provided at the information handling system.

2. The computer-implemented method of claim 1, wherein prioritizing pre-loading of the subset of data blocks includes obtaining the subset of data blocks from the remote data store of the remote server computing system at the information handling system without user interaction.

3. The computer-implemented method of claim 1, wherein identifying the contextual data includes identifying a location of the information handling system when tagging the data block with identifiers, wherein generating the configuration policy including the configuration rules includes generating the configuration policy based on the location of the information handling system.

4. The computer-implemented method of claim 3, further comprising identifying the configuration rules based on the location of the information handling system at the second time.

5. The computer-implemented method of claim 4, wherein the identified configuration rules prevents access of the subset of the data blocks at the information handling system at the location of the information handling system at the second time.

6. The computer-implemented method of claim 1, wherein identifying the contextual data includes identifying a time of the information handling system when tagging the data block with identifiers, wherein generating the configuration policy including the configuration rules includes generating the configuration policy based on the time of the information handling system.

7. The computer-implemented method of claim 6, further comprising identify the configuration rules based on the time of the information handling system at the second time.

8. The computer-implemented method of claim 1, wherein prioritizing pre- loading of the subset of data blocks to be provided at the information handling system further includes minimizing latency of providing the subset of data blocks at the information handling system.

9. An information handling system (IHS), comprising:
a memory media storing instructions;
a processor in communication with the memory media to execute the instructions to perform operations comprising:
performing, at first time, a calibration and configuration of a data contextual migration model, including:
identifying contextual data associated with contextual inputs to an information handling system, the contextual data including user contextual data, environmental context data, and system telemetry contextual data;
training, based on the contextual data, the data contextual migration model, including:
tagging, for each data block of a plurality of data blocks, the data block with identifiers indicating a store location of the data block;

storing, based on the identifier associated with each data block of the data blocks, the data block at a local data store of the information handling system, at a remote data store of a remote server computing system, or both;

generating a configuration policy including configuration rules, the configuration rules for prioritizing pre-loading of a subset of the data blocks to be provided at the information handling system;

performing, by the data contextual migration computing module at a second time, a steady-state monitoring of the information handling system, including:

monitoring the contextual inputs of the information handling system; and in response to monitoring the contextual inputs, i) accessing the data contextual migration model including the configuration policy, ii) identifying one or more of the configuration rules based on the monitored contextual inputs, and iii) applying the one or more configuration rules to prioritize pre-loading of the subset of data blocks to be provided at the information handling system.

10. The information handling system of claim 9, wherein prioritizing pre-loading of the subset of data blocks includes obtaining the subset of data blocks from the remote data store of the remote server computing system at the information handling system without user interaction.

11. The information handling system of claim 9, wherein identifying the contextual data includes identifying a location of the information handling system when tagging the data block with identifiers, wherein generating the configuration policy including the configuration rules includes generating the configuration policy based on the location of the information handling system.

12. The information handling system of claim 11, the operations further comprising identifying the configuration rules based on the location of the information handling system at the second time.

13. The information handling system of claim 12, wherein the identified configuration rules prevents access of the subset of the data blocks at the information handling system at the location of the information handling system at the second time.

14. The information handling system of claim 9, wherein identifying the contextual data includes identifying a time of the information handling system when tagging the data block with identifiers, wherein generating the configuration policy including the configuration rules includes generating the configuration policy based on the time of the information handling system.

15. The information handling system of claim 14, the operations further comprising identify the configuration rules based on the time of the information handling system at the second time.

16. The information handling system of claim 9, wherein prioritizing pre-loading of the subset of data blocks to be provided at the information handling system further includes minimizing latency of providing the subset of data blocks at the information handling system.

17. A non-transitory computer-readable medium storing software comprising instructions executable by one or more computers which, upon such execution, cause the one or more computers to perform operations comprising:

performing, at first time, a calibration and configuration of a data contextual migration model, including:

identifying contextual data associated with contextual inputs to an information handling system, the contextual data including user contextual data, environmental context data, and system telemetry contextual data;

training, based on the contextual data, the data contextual migration model, including:

tagging, for each data block of a plurality of data blocks, the data block with identifiers indicating a store location of the data block;

storing, based on the identifier associated with each data block of the data blocks, the data block at a local data store of the information handling system, at a remote data store of a remote server computing system, or both;

generating a configuration policy including configuration rules, the configuration rules for prioritizing pre-loading of a subset of the data blocks to be provided at the information handling system;

performing, by the data contextual migration computing module at a second time, a steady-state monitoring of the information handling system, including:

monitoring the contextual inputs of the information handling system; and in response to monitoring the contextual inputs, i) accessing the data contextual migration model including the configuration policy, ii) identifying one or more of the configuration rules based on the monitored contextual inputs, and iii) applying the one or more configuration rules to prioritize pre-loading of the subset of data blocks to be provided at the information handling system.

18. The non-transitory medium of claim 17, wherein prioritizing pre-loading of the subset of data blocks includes obtaining the subset of data blocks from the remote data store of the remote server computing system at the information handling system without user interaction.

19. The non-transitory medium of claim 17, wherein identifying the contextual data includes identifying a location of the information handling system when tagging the data block with identifiers, wherein generating the configuration policy including the configuration rules includes generating the configuration policy based on the location of the information handling system.

20. The non-transitory medium of claim 19, the operations further comprising identifying the configuration rules based on the location of the information handling system at the second time.

* * * * *